May 17, 1960

H. LANG 2,936,816

METHOD AND APPARATUS FOR SEALING THERMOPLASTIC CONTAINERS

Filed Aug. 2, 1955

INVENTOR.
HELMUTH LANG
BY
Connolly and Hutz
HIS ATTORNEYS

May 17, 1960
H. LANG
2,936,816
METHOD AND APPARATUS FOR SEALING
THERMOPLASTIC CONTAINERS
Filed Aug. 2, 1955
3 Sheets-Sheet 2
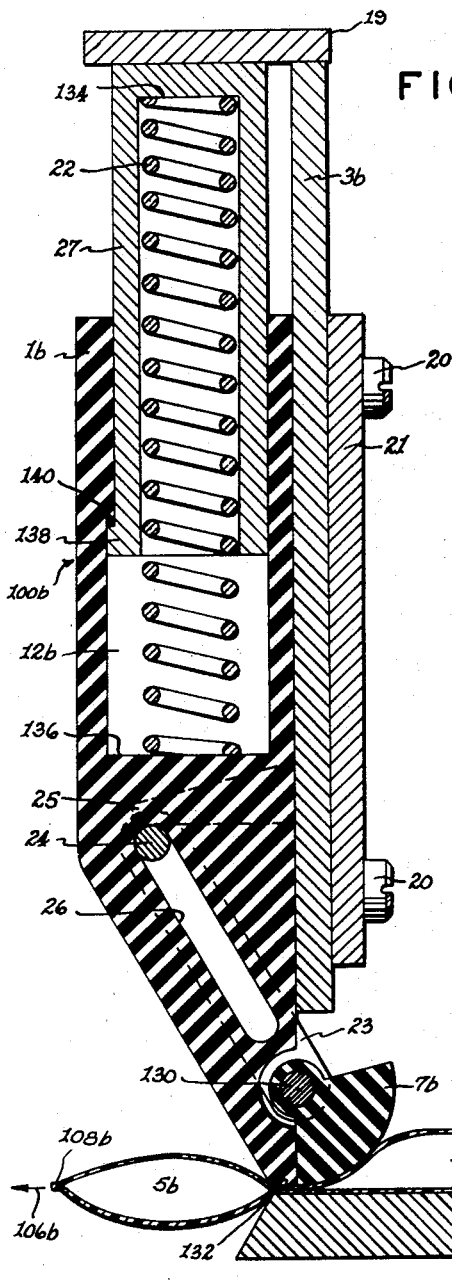
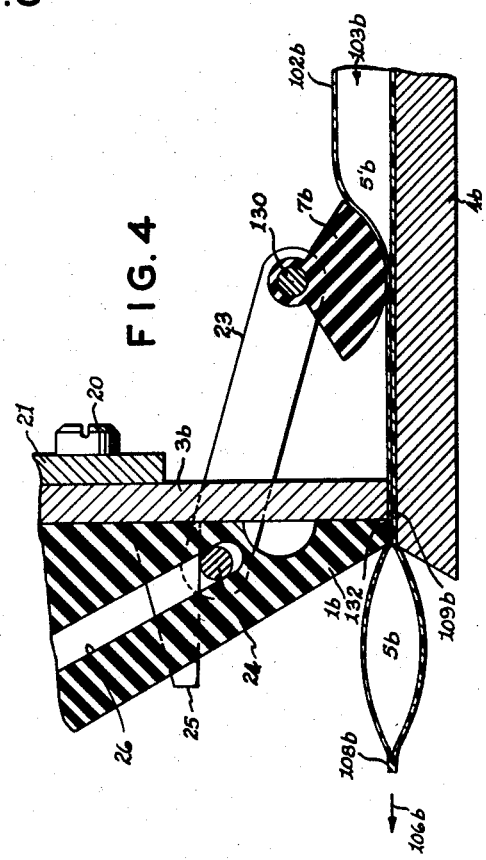
INVENTOR.
HELMUTH LANG
BY
Connolly and Hutz
HIS ATTORNEYS

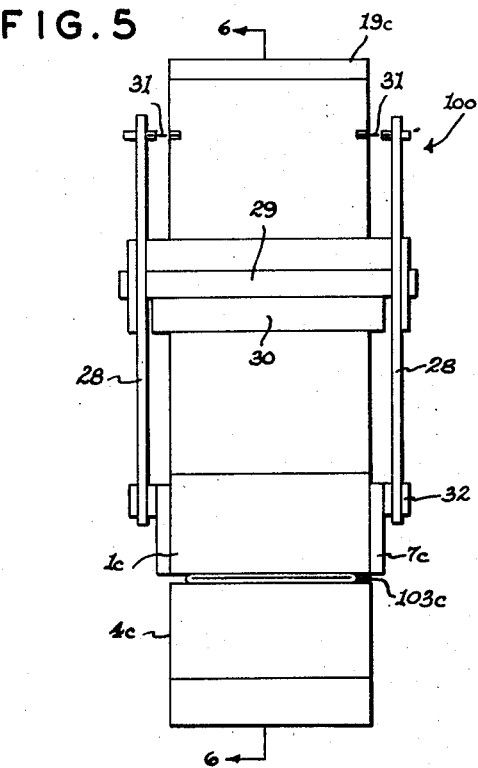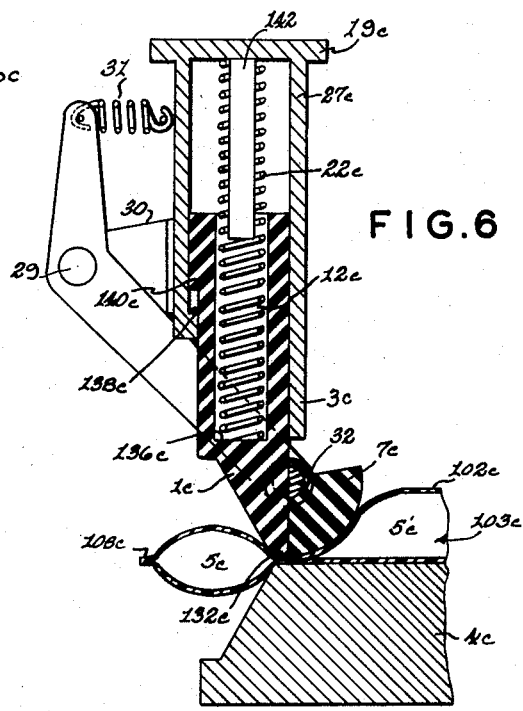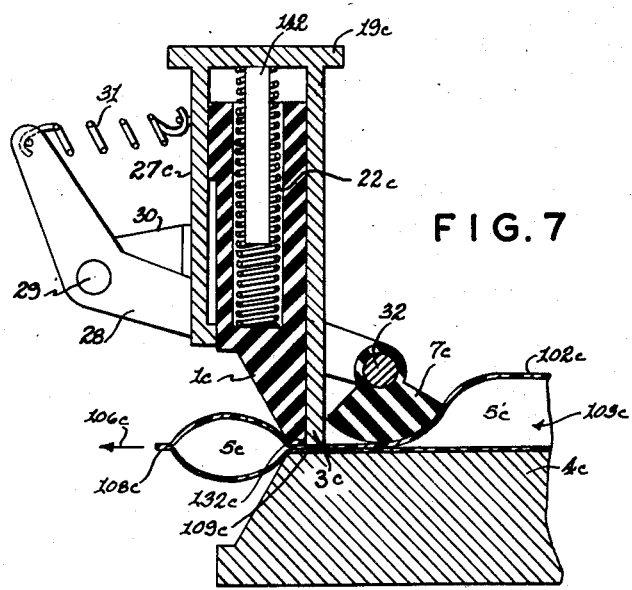

United States Patent Office 2,936,816
Patented May 17, 1960

2,936,816

METHOD AND APPARATUS FOR SEALING THERMOPLASTIC CONTAINERS

Helmuth Lang, Hochberg, near Siegsdorf, Wernleiten, Germany, assignor to Farbwerke Hoechst Aktiengesellschaft vormals Meister Lucius & Brüning, Frankfurt am Main Hochst, Germany, a German company Application August 2, 1955, Serial No. 525,932

Claims priority, application Germany August 6, 1954

9 Claims. (Cl. 154—42)

This invention relates to a method and apparatus for sealing thermoplastic containers, and more particularly to a method and apparatus for sealing filled thermoplastic containers.

In a known method of packaging liquids, fluid salves, fine powders and other flowing materials, seams are welded across a filled thermoplastic container, which may be a tube, to divide the tube into a number of filled containers. This welding operation is usually accomplished by tools which are heated either by electrical resistance elements or which utilize high-frequency heating phenomena. Welding tools heated by resistance elements may be continuously energized, but the high-frequency welding tools can only be instantaneously energized.

The pressure of the filling material forces the tube to assume a cylindrical or at least elliptical cross section. The walls of the tube must, therefore, be pressed flatly together in order to weld a seam across the tube. This displaces the filling material from the zone that will accommodate the welding seam. It is desired that this displacement be as complete as possible so that the walls of the tube in the zone to be welded are in intimate contact with each other.

Pressing and welding are sometimes accomplished with separate tools, or the same tool may be used for both pressing and welding. A heated tool should not be used for pressing. The pressure of the heated tool tends to weaken the thermoplastic pressurized wall of the tube. Use of separate tools, however, may incorporate the disadvantage of separated working zones. When the welding tool is used to physically displace the pressing tool from a single working zone, this may cause incomplete displacement of the filling material or physical injury to the tube.

In accordance with this invention, pressure is applied across a portion of the container by a cold pressure applying means. This forces the walls of the container into intimate contact with each other and substantially displaces the filling material from the zone that will accommodate the welded seam. Heat is then applied by means of a welding means to a portion of this zone while the walls are held firmly in intimate contact with each other by the firm pressure maintained on the other portions of the zone by the cold pressure applying means. This results in a firmly welded seam.

According to this invention, a fluid-filled container of thermoplastic material, in the form of an endless tube or a finite container, may be divided into completely sealed single packages. A pressing tool and a welding tool are applied successively to the same zone of the tube in a manner wherein the working surface of the welding tool falls only within the working plane of the pressing tool. The working surface of the welding tool, therefore, can be substantially equal in area to the working surface of the pressing tool or smaller. The opposite walls of the container lying within the working zone are initially seized and pressed against each other to completely displace the filling material from the pressed zone. This forces the walls of the container into intimate contact with each other so that practically no particles of the filling material can remain between the contacting walls.

In one form of this invention, the welding tool moves within a chamber within a hollow pressing tool. This welding tool is in the form of a high-frequency electrode. A thin wall closing off the bottom of the chamber is permeable to high-frequency electrical energy and heat may be, therefore, developed within the thermoplastic material to form the seal when the welding tool is moved adjacent this thin wall, while the walls are held in firm contact by the hollow pressing tool.

In another form of this invention, a portion of the pressing tool then moves away from the tube wall to free a central portion of the empty working zone for application of the welding tool. While the welding tool is applied, the container on all sides of the welding zone is maintained pressed together by the pressing tool. The welding tool then welds together the overlying layers of thermoplastic material to form a seam.

This sealing method makes it possible to displace the filling material without utilizing the welding tool which might weaken the synthetic thermoplastic walls of the container. This prevents exposure of the package walls to heat which might decrease the strength and ability to retain the filling material, especially when subjected to a pull in advancing the sealed containers through the sealing apparatus.

This process may be used, for example, on liquid-filled containers in the form of an endless tube or also on containers formed of synthetic thermoplastic material sheets, which are fabricated by welding or otherwise. The endless tube and single containers are respectively sealed into small single packages of any desired form and contour. For both types of containers, single packages may be sealed off by each welded seam.

The novel features and advantages of the present invention will be apparent to one skilled in the art from a reading of the following description in conjunction with the accompanying drawings in which:

Fig. 3 is a cross-sectional view in elevation of a further embodiment of this invention;

Fig. 4 is a cross-sectional view in elevation of a portion of the embodiment shown in Fig. 3 in a further operational phase;

Fig. 5 is an elevational view of a still further embodiment of this invention.

Fig. 6 is a cross-sectional view in elevation taken through Fig. 5 along the line 6—6 looking in the direction of the arrows; and Fig. 7 is a cross-sectional view in elevation similar to Fig. 6 in a further operational phase.

Figure 1:
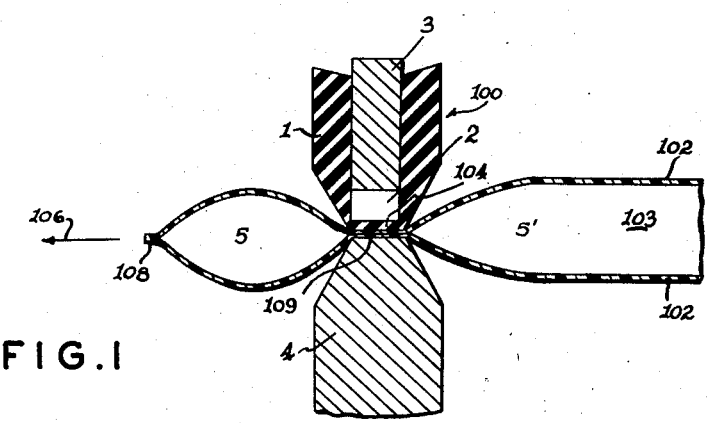
Fig. 1 is a cross-sectional view in elevation of one embodiment of this invention.

Parts repeated in successive figures are designated by the same numerical reference characters followed by indicative alphabetical suffixes.

In Fig. 1 the opposed support 4 and tool 100 are shown applying pressure across the walls 102 of tube 103. The tool 100 includes a cold pressing portion 104 and a welding portion 3. The tool 100 includes a hollow beam 1. This beam 1 is made of non-conductive material such as Bakelite, rubber, a ceramic material, or the like. The beam 1 acts vertically against the tube 103 and tapers to a lower pressure portion 104. A chamber 2 extends vertically within the beam 1. The welding tool 3 is disposed in this chamber. Welding tool 3 represents a high-frequency electrode and is arranged to move up and down within chamber 2. Chamber 2 is closed off at its lower end by a thin wall which constitutes the pressure portion 104 of beam 1. The external or fixed support 4 is made of electricity conducting material such as copper. It can, therefore, act as a cooperating electrode for the welding tool 3.

The tube 103 is diagrammatically represented in Fig. 1. It is divided into two portions by the pressure of the tool 100 against the opposed support 4. Section 5 of the tube 103, to the left of the tool, represents a single container which is completed by the illustrated welding process. Portion 5' represents the portion of the container or tube that is being fed towards the welding tool to be divided into a number of separate containers. The direction of feed of the tube is indicated by the arrow 106.

When the walls 102 of the tube are pressed together by the opposed tool 100 and support 4, the material between the walls is displaced into other portions of the tube from a zone that will accommodate the welded seam. While these walls are firmly held in intimate contact, the welding tool 3 is moved adjacent the lower wall or pressure portion 104 of the tool 100. The high-frequency electrode 3 is energized by means of a high-frequency generator. Since thin wall 104 is permeable to high-frequency electrical energy, heat is developed within the thermoplastic material which firmly welds it together. This forms a seam 109 which in conjunction with the previously welded seam 108 seals a single container 5.

The high frequency generator (not shown) is substantially a radio transmitter or oscillator with its output side connected to the electrodes of the sealer instead of to a transmitting antenna. Shielded oscillators may operate at any frequency, but unshielded must operate only in assigned bands.

The tube 103 shown in the various figures is made of any thermoplastic material. This thermoplastic tubing may be made, for example, of commonly known and available plasticized polyvinyl chloride.

Figure 2:
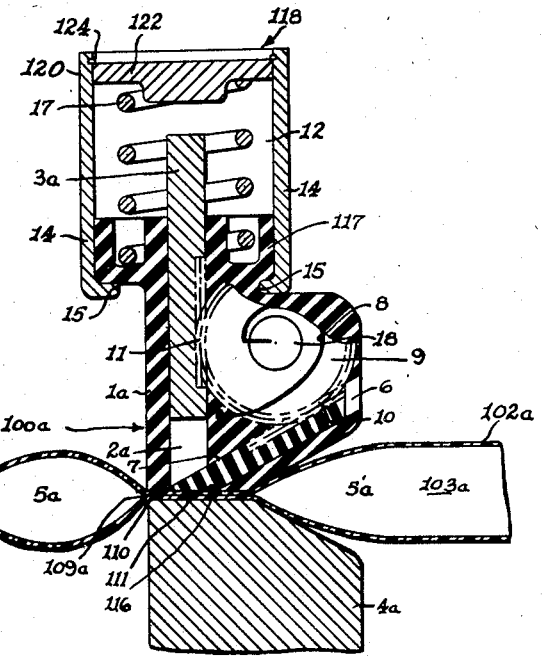
Fig. 2 is a cross-sectional view in elevation of another embodiment of this invention.

Fig. 2 shows a tool 100a which includes two cold pressing portions 110 and 111. Tool 100a includes a hollow beam 1a having a vertical chamber 2a. A welding tool 3a is movably supported within chamber 2a. A second chamber 6 is provided in beam 1a. Chamber 6 extends downwardly at an angle through beam 1 and has a common lower opening 116 with chamber 2a. An auxiliary pressing tool or pressing portion 7 is movably supported or guided within chamber 6. Chamber 6 guides pressing portion 7 into contact with the tube wall. The auxiliary pressing portion 7 is made of a non-conductive material such as plastic, wood, ceramic, or rubber.

Tool 7 is resiliently biased to extend downwardly through the lower portion of beam 1a by a gear 9 which meshes with a rack 10 provided in an upper surface of movable pressing portion 7. A torque is applied by a torsion spring 8 to move gear 9 in a direction to move portion 7 in a downward direction. Spring 8 is attached to beam 1a and reacts upon a rotatable shaft 18 upon which gear 9 is mounted. Gear 9 is also meshed with a rack 11 vertically disposed in the side of welding tool 3a. Welding tool 3a is thereby resiliently biased upward away from the lower face of the pressing portion of the tool 1a while the auxiliary pressing portion 7 is resiliently biased to extend out of the opening 116 in the lower portion of pressing tool 1a.

The welding tool 3a is energized by means of a high frequency generator (not shown) in a similar manner as that described in conjunction with Fig. 1. The welding tool 3a extends upwardly within chamber 2a and beam 1a. Beam 1a includes an upper enlarged head portion 117 which is operatively associated with a force applying means 118. This force applying means includes a cylinder 12, which encloses the upper portion of the beam 1a. The top of the cylinder is closed by a movable disc 122. This disc is resiliently maintained by means of a compression spring 17 in contact with a lock ring 124 recessed within the upper part of the cylinder 120. The base portion of cylinder 12 is locked about the upper portion 117 of the beam 1a by means of inwardly directed flange 15.

When a downward force is applied to the head 122 of cylinder 12 the tool assembly 100a is pressed firmly against the tube wall. This causes the cold pressure applying portions 110 and 111 of beam 1a and auxiliary pressing tool 7 respectively to apply a pressure in conjunction with the upper surface of support 4a across the portion of tube 103a held between them. This displaces the filling material from the portion of the tube held between the two opposed pressure applying members. This places the walls 102a of the tube in intimate contact with each other within a zone of the tube that will accommodate the welded seam.

When an additional predetermined downward force is applied to the head 122 spring 17 is compressed and head 122 moves downward to contact the top portion of welding tool 3a. Welding tool 3a is thereby caused to move in a downward direction. Rack 11 of welding tool 3a reacts upon gear 9 causing gear 9 to rotate against the torsion applied by spring 18 in a direction to cause auxiliary pressing tool 7 to be withdrawn or moved aside from the tube wall. When welding tool 3a contacts the tube wall, pressing tool 7 has been withdrawn and moved aside from the opening 116 in the lower portion of the beam 1a. Welding tool 3a, therefore, contacts the tube wall within a zone which is maintained free of filling material and with tube walls in intimate contact. This zone is maintained, as described, by virtue of the firm pressure maintained by the firmly held pressure portions provided by the lower end of beam 1a on both sides of aperture 116. A firm seal can, therefore, be applied by heat applied by means of welding tool 3a.

In Figs. 3 and 4, illustrating a further embodiment of this invention, the tool 100b is shown in two phases of its operation. In Fig. 3 the welding tool 100b is shown as it initially contacts the surface of the tube wall. Tool 100b and opposed support 4b compress the tube 103b so that portions of the tube wall 102b move into intimate contact with each other. The initial pressure is applied at the lower end of a hollow beam 1b and auxiliary pressure is applied by means of a shoe 7b rotatably supported at the lower end of a link 23. Link 23 is attached or coupled to a portion of beam 1b in a manner to be later described.

The upper end of link 23 is fixed to a pin or shaft 24. This shaft 24 is disposed within an inclined slot 26 which is formed in the lower portion of beam 1b. The shoe 7b is formed of an elastic material such as hard rubber and is pivoted to the lower end of link 23 by means of a pin or shaft 130. When link 23 is in its normal position with the pin 24 at the upper portion of slot 26, the shoe 7b lies adjacent and forms a continuation of the lower portion of beam 1b. The shoe 7b is formed as a sector of a circle with a radius lying adjacent the vertical edge of beam 1b. The lower curved surface of shoe 7b, therefore, forms a smooth continuation of the flat lower surface 132 of beam 1b. Only one link and attached members are shown in this cross-sectional view but a corresponding link and supports (not shown) are provided to support the end of shoe 7b not shown herein.

A welding tool 3b lies adjacent the vertical surface of beam 1b overlying the shoe 7b. This welding tool 3b is guided against this surface by a plate 21 which is attached to beam 1b by cap screws 20. Cap screws 20 extend through slots (not shown) in tool 3b to permit vertical movement of tool 3b relative to beam 1b. Welding tool 3b includes a horizontal projection 25 which lies over pin 24 associated with link 23.

The welding tool 3b extends a distance above the top of beam 1b so that it may be contacted by a force applying means or striking member 19 which is resiliently supported a distance above the top of beam 1b by means of a hollow cylinder 27 which is resiliently supported within chamber 12b by a compression spring 22. Spring 22 bears against the upper head 134 of cylinder 27 and against a flat horizontal surface 136 provided at the bottom of hollow chamber 12b in hollow beam 1b. The cylinder 27 thereby telescopes within the upper portion of beam 1b. The cylinder 27 includes an outward projection 138 which engages a corresponding inward projection 140 provided in the wall of chamber 12b of beam 1b to prevent the cylinder 27 from being lifted out of and away from beam 1b by the pressure of spring 22.

When a downward force is applied to the head 19 the spring 22 is compressed. This causes the cylinder 27 and head 19 to move in a downward direction. A downward pressure is thereby provided to initially compress the tube 103b between the support 4b and the cooperating cold pressure portions provided by beam 1b and shoe 7b. This moves the walls 102b of the tube into intimate contact with each other throughout a limited zone as shown in Fig. 3.

As more force is applied to head 19, the welding tool 3b starts to move in a downward direction relative to beam 1b. Projection 25 attached to beam 3b also moves in a downward direction. As it starts to move it contacts the shaft 24 and moves the shaft and attached link 23 in a downward direction within the inclined slot 26. The link 23, therefore, moves downward and towards the right. The lower portion and shoe 7b of link 23 move towards the right while maintaining contact within the surface of the tube wall 102b. The shoe 7b rotates about pivot 130 to maintain a downward pressure upon the tube wall. The link 23 thereupon moves to a more horizontal position, as shown in Fig. 4, and maintains sufficient pressure upon the tube wall to displace a further amount of filling material from between the tube walls. By this translation of shoe 7b, the tube walls 102b are maintained in intimate contact with each other throughout a considerable zone in preparation for being welded by the downcoming welding tool 3b.

When the welding tool 3b contacts the surface of the tube 103b, the auxiliary pressing portion or shoe 7b has moved aside from its path so that tool 3b may contact the exposed tube surface. The stationary beam 1b maintains a firm pressure on the tube while shoe 7b presses further portions of the tube wall together. Pressure portions 132 and 7b act upon the two separated areas between which the welding tool 3b contacts the tube wall. When heat is applied by means of tool 3b, the walls 102b are welded at 109b to seal off container 5b from the tube which is being fed in the direction indicated by the arrow 106b.

In Figs. 5, 6 and 7 another form of the present invention somewhat similar to that shown in Figs. 3 and 4 is illustrated. In Figs. 5 and 6 the tool 100c is shown in position as it initially compresses the tube 103c in conjunction with the fixed support 4c. The tool 100c includes a hollow beam 1c which in conjunction with a shoe 7c provides pressure to displace the material from between the walls of the tube 103c in a zone that will accommodate the welded seam and to maintain the walls 102c of the tube 103c in intimate contact throughout this zone. The shoe 7c is sector-shaped and similar to shoe 7b in function. It is initially maintained with a radial edge in contact with a vertical edge of beam 1c by means of a link 28 which is pivoted to a bracket 30 by means of a shaft 29. Shoe 7c is pivoted to the lower portion of link 28 by means of shaft 32. The shaft 29 is attached to the force applying cylinder 27c by means of bracket 30.

The cylinder 27c encloses the upper portion of beam 1c and includes an upper head 19c. A compression spring 22c is disposed within the hollow chamber 12c in the upper portion of beam 1c and reacts against the upper surface 136c of the lower end of chamber 12c and against the head 19c of cylinder 27c. A rod 142 extends downwardly from the head 19c within the center of spring 22c toward the bottom of chamber 12c. This rod 142 guides the telescoping travel of beam 1c within cylinder 27c. A stopping device for preventing the cylinder 27c from being disengaged from the upper portion of beam 1c by spring 22c is provided by projections 138c and 140c provided on cylinder 27c and beam 1c respectively. The edge of cylinder 27c disposed directly over shoe 7c is utilized as a welding tool and is designated by the reference character 3c. The link 28 extends upwardly past the pivot 29. The upper end of link 28 is resiliently attached to the cylinder wall by a tension spring 31. This tension spring reacts upon the lever 28 to maintain a radial surface of link 7c engaged with a lower vertical surface of beam 1c to form a smooth curved continuation of the bottom of beam 1c.

Fig. 7 shows the relative position of the elements when a predetermined force has been applied to cylinder head 19c to bring the welding tool portion 3c into initial engagement with the tube 103c. The tool 3c meets the surface of the tube within a zone that will accommodate the welded seam. This zone is maintained free of filling material and with the tube walls in initimate contact with each other by means of the separated pressures provided by the firmly held lower end 132c of beam 1c and the pressure of shoe 7c.

As the cylinder 27c moves in a downward direction it carries brackets 30 and shaft 29 down with it. The lower end of shoe 7c and link 28 are reacted upon by the tube 103c in a direction to cause the link 28 to rotate in a counterclockwise direction against the tension of spring 31. This causes the shoe 7c to rotate about shaft 32 and move aside out of the downward path of welding tool 3c while maintaining itself in sweeping contact with the upper surface of tube 103c. This displaces an additional amount of filling material from between the tube walls 102c and prepares an extended zone of intimately contacting tube walls for welding. When the welding tool 3c contacts the tube walls and is energized in the usual manner, a firm seal 109c is welded within the tube walls. This seals off a single container 5c in conjunction with previously welded seam 108c.

High-frequency electrodes may be used, for example, as the welding tool. This permits the working surface of the working tool to remain relatively cool. Additional cooling devices may also be used, if desired, to cool the welding tool. This may be done, for example, by means of compressed air or water.

Of course this invention may be practiced by other forms of apparatus without deviating from its principle of operation and structure.

This structure is characterized by use of a combination pressing tool which includes a two part pressing tool and a welding tool which is formed as a high-frequency electrode. The welding tool alternates within the working zone with one part of the pressing tool. The pressing and welding tools cooperate with an outer support or outer pressing tool, which is preferably formed, for example, of electricity conducting material. The surface of the outer pressing tool is at least as large as the total surface of the combined pressing and welding tool.

What is claimed is:

1. A process for welding a seam across a tubular thermoplastic container filled with flowable goods being packaged in a zone where the presence of said material normally separates the walls of said container, said process comprising the steps of applying pressure across said container to displace said flowable goods from a zone between said walls that will accommodate said seam, maintaining said pressure to firmly hold said walls in intimate contact with each other within said zone, applying a sealing tool within an area enclosed by said zone and across said container relieving the pressure within the central portion of said zone before application of said sealing tool, and applying said sealing tool within said area of relieved pressure.

2. A process as set forth in claim 1 wherein a portion of the initial pressure is shifted laterally to free said central zone for application of said sealing tool, and said pressure being maintained within the outer portions of said zone to maintain said flowable goods displaced from said entire zone as said sealing tool is applied across said container to weld a seam completely across said container.

3. A device for welding a seam completely across a tubular thermoplastic container filled with a flowing material in a zone where said material normally separates the walls of said container, said device comprising opposed means extending completely across said container for applying a pressure across it to displace said material from between said walls in a zone extending completely across said container for accommodating said seam, one of said opposed means including pressing elements and a separate heated welding element extending completely across said container, guide means operatively engaging said welding and said pressing elements to direct their movements towards and away from said container, coupling means connecting said welding element to at least one of said pressing elements in a manner which reacts in conjunction with said guide means to move said one of said pressing elements out of the path of said welding element and to move said welding element into welding contact with said container within the working plane of said pressing elements after said pressing elements are moved towards said other opposed means to displace said flowing material from a zone between the walls of said container, and said welding tool being applicable to an area of said container enclosed by said zone to weld a seam extending completely across said container.

4. A device as set forth in claim 3 wherein said pressing element includes a first and second element, said welding element is resiliently coupled to said first pressing element with its lower end normally raised a short distance above the lower end of said first pressing element, said second pressing element being normally disposed in the path of movement of said welding element, channel means for guiding said second pressing element out of the path of movement of said welding element, and said welding element being operatively engaged with said second pressing element to move said second pressing element out of the path of movement of said welding element as said welding element comes into contact with said container wall upon application of a downward force to said welding element.

5. A device as set forth in claim 4 wherein said welding element is mounted in a chamber within said first pressing element and said second pressing element is mounted in an inclined passageway within said first pressing element, the lower end of said inclined passageway merging with the lower end of said chamber, said welding portion and said second pressing element including a rack, and a gear meshed with both said racks so that said movable portion is retracted up and away from said central portion of said zone when said welding element is moved downward into contact with said container.

6. A device as set forth in claim 4 wherein said second pressing element normally assumes a position adjacent the lower end of said first pressing element and is a smooth continuation thereof, said second pressing element being pivoted to the lower end of a rod, said first pressing element including an inclined slot within which the upper end of said rod is operatively engaged, said welding element being mounted to slide adjacent said first pressing element above the normal position of said second pressing element, and a projection extending from said welding element which contacts the upper end of said rod to cause said second pressing element to move laterally while maintaining contact with said container wall to free a central zone into which said welding element moves into contact with said container.

7. A device as set forth in claim 6 wherein the lower end of said second pressing element is formed as a sector of a cylinder whose axis lies across said container.

8. A device as set forth in claim 7 wherein said cylinder is made of an elastic material.

9. A device as set forth in claim 4 wherein said welding element is telescopically mounted with respect to said first pressing element, said second pressing element being pivoted at the lower end of a lever, said lever being rotatably mounted upon said welding element, a compression spring reacting between said welding element and said pressing element to maintain said welding element raised above the normal position of said second pressing element, and a tension spring connecting the upper end of said lever to said welding element to maintain said second pressing element adjacent said first pressing element.

References Cited in the file of this patent

UNITED STATES PATENTS

| | | |
|---|---|---|
| 2,491,226 | Jacques et al. | Dec. 13, 1949 |
| 2,631,646 | Gannon et al. | Mar. 17, 1953 |
| 2,646,105 | Langer | July 21, 1953 |
| 2,679,469 | Bedford | May 25, 1954 |
| 2,746,514 | Warnken | May 22, 1956 |
| 2,805,973 | Klasing et al. | Sept. 10, 1957 |
| 2,830,647 | Warnken | Apr. 15, 1958 |